United States Patent [19]

Obama et al.

[11] Patent Number: 5,238,608
[45] Date of Patent: Aug. 24, 1993

[54] RESIN CLEANING COMPOSITION COMPRISING POLYOLEFIN, SULFONATE, AND COPOLYMER

[75] Inventors: Kenjiro Obama; Nobukazu Atsumi; Hiroyuki Fujii, all of Chiba, Japan

[73] Assignee: Chisso Corporation, Osaka, Japan

[21] Appl. No.: 822,132

[22] Filed: Jan. 17, 1992

[30] Foreign Application Priority Data

Jan. 31, 1991 [JP] Japan ................................. 3-29010

[51] Int. Cl.$^5$ .......................... C11D 1/12; C11D 1/22; C11D 3/10
[52] U.S. Cl. ............................... 252/535; 252/174.23; 252/174.14; 252/174.25; 252/539; 252/DIG. 2
[58] Field of Search ..................... 252/174.23, 174.14, 252/174.25, 535, 539, DIG. 2

[56] References Cited

U.S. PATENT DOCUMENTS

| | | | |
|---|---|---|---|
| 4,430,468 | 2/1984 | Schumacher | 524/109 |
| 4,838,945 | 6/1989 | Fujii et al. | 134/7 |
| 4,838,948 | 6/1989 | Bailey | 134/8 |
| 4,976,788 | 12/1990 | Nohr et al. | 134/5 |
| 4,978,707 | 12/1990 | Tanaka | 524/509 |
| 5,087,653 | 2/1992 | Obama et al. | 252/174.23 |
| 5,139,694 | 8/1992 | Kmiec | 252/174.23 |

FOREIGN PATENT DOCUMENTS

| | | |
|---|---|---|
| 58-149998 | 9/1983 | Japan . |
| 60-139411 | 7/1985 | Japan . |
| 62-195045 | 8/1987 | Japan . |
| 62-54647 | 11/1987 | Japan . |
| 63-66245 | 3/1988 | Japan . |
| 1-167353 | 7/1989 | Japan . |
| 3-182535 | 8/1991 | Japan . |
| 3-207734 | 9/1991 | Japan . |

*Primary Examiner*—Paul Lieberman
*Assistant Examiner*—Kery A. Fries
*Attorney, Agent, or Firm*—Leydig, Voit & Mayer

[57] ABSTRACT

The present invention provides a cleaning composition for a resin molding machine which comprises 50 to 95% by weight of a polyolefin resin having a melt index of 0.01 to 0.5, 0.1 to 15% by weight of an acrylic copolymer, 2 to 30% by weight of a neutral salt of organic sulfonic acid and 0.1 to 10% by weight of basic magnesium carbonate, magnesium hydroxide, potassium carbonate, zinc carbonate or a mixture of two or more thereof.

This composition is suitable for the cleaning of the molding machine at a time of changeover of super-engineering plastics at the molding temperature of the plastics which is about 400° C.

4 Claims, No Drawings of cleaning composition for use in a molding machine

RESIN CLEANING COMPOSITION COMPRISING POLYOLEFIN, SULFONATE, AND COPOLYMER

BACKGROUND OF THE INVENTION

1. Field of the Invention

The present invention relates to a cleaning composition for use in processing/molding machines for thermoplastic resins.

2. Description of the Related Art

In the processing/molding fields of plastics, there is the tendency of produce many kinds to plastics in a small amount of each kind, and so the production of the plastics must often be changed from one kind of plastics to another kind. Therefore, it is important from the viewpoint of quality control to clean the interior of a molding machine at the time of the change-over of the plastic.

In the processing/molding step of the plastics, some measures are taken to eliminate the influence of the preceding resin at the time of its production changeover. In particular, when the preceding resin is a colored resin, for example, when the preceding grade having a deep color, such as blue or black is changed to another grade having a light color, such as white, it is required to clean the interior of the molding machine with a cleaning resin, to perform troublesome operations such as the disassembly and cleaning of the processing/molding machine, and to stop the production. For example, in the case of the changeover of the colored product in an extrusion granulation step, an extruder is stopped and a screw is then drawn therefrom, and the screw and the interior of a cylinder are cleaned by brushing or the like, and afterward, the screw must be mounted again. In a manner in which the preceding kind of resin is replaced with a substitution resin without drawing the screw, a large amount of the resin is needed for the cleaning, and soils on intricate structure parts in the extruder cannot be removed. In consequence, there is the problem that the subsequent resin is colored inconveniently. In order to solve these problems, cleaning compounds are used. The employment of the cleaning compound facilitates the removal of the remaining material in the extruder and thereby permits the completion of the grade changeover by the use of a small amount of the substitution resin. The cleaning compounds can be classified into cleaning compounds containing a lubricant such as stearic acid and cleaning compounds containing an acrylic resin having hardness. However, the former is poor in cleaning effect. The latter gives off a strong odor, and since it is used in a semi-molten state, the load increases and therefore the cleaning compound must be used after the disassembly of a die, a breaker plate, a wire net and the like, which means that the problem of a complex operation remains unsolved.

For example, Japanese Patent Application Laid-open No. 62-195045 discloses a composition comprising a thermoplastic resin, a sodium alkylbenzenesulfonate and a water-repellent compound, and Japanese Patent Application Laid-open No. 63-66245 discloses a cleaning composition comprising a thermoplastic resin, a sulfonic acid neutral salt and a powdery inorganic compound having a particle diameter of 0.05 to 10 μm. Furthermore, a combination of these techniques is described in U.S. Pat. No. 4,838,945. In addition, U.S. Pat. No. 4,838,948 discloses a cleaning process for a resin processing apparatus by the use of polyethylene, calcium carbonate and a sulfonic acid salt activator.

However, these techniques are suitable for the so-called general-purpose plastics where a molding temperature is about 300° C. or less. In recent years, engineering plastics and superengineering plastics have come out, and in most of these cases, the molding temperatures are 300° C. or more and in extreme cases, they are in excess of 400° C. This temperature range is noticeably different from that of the general-purpose plastics.

At such high temperatures, the conventional cleaning compounds cannot maintain viscoelasticity at the time of melting, so that the viscosity deteriorates. For this reason, the conventional cleaning compounds are not usable at the high temperatures.

As discussed above, there has not heretofore been any cleaning composition for the color changeover and material changeover of the super-engineering plastics in the molding step thereof. Hence, in the molding of the super-engineering plastics, the removal of the plastics is carried out by using a polycarbonate resin (containing a glass fiber) at about 300° C. to which the molding temperature is gradually lowered from 400° C. Therefore, a part of the resin is lost and the screw in the molding machine tends to be damaged by the glass fibers. Furthermore, it is necessary to raise the temperature of the super-engineering plastics up to the molding temperature again in the subsequent molding step, which requires the complex operation of raising and lowering the temperature and which takes a long period of time. In addition, the cleaning effect is also poor.

Thus, a cleaning composition is desired which can sufficiently maintain viscoelasticity at the melting time even at a high temperature such as 400° C., i.e., the molding temperature of Empla or Super-empla and which can exert the cleaning effect.

SUMMARY OF THE INVENTION

An object of the present invention is to provide a cleaning composition for a molding machine which can obtain a noticeable cleaning effect at a high temperature in a color changeover step and a material changeover step of super-engineering plastics whose molding temperature is about 400° C.

The present inventors have found that a composition comprising a specific polyolefin resin, an ethylene ethyl acrylate copolymer, sodium dodecylbenzenesulfonate and basic magnesium carbonate can obtain an excellent cleaning effect at a high temperature, and the present invention has been completed.

The cleaning composition of the present invention is characterized by 50 to 95% by weight of a polyolefin resin having a melt index of 0.01 to 0.5, 0.1 to 15% by weight of an ethylene-acrylic copolymer, 2 to 30% by weight of a neutral salt of an organic sulfonic acid and 0.1 to 10% by weight of basic magnesium carbonate, magnesium hydroxide, potassium carbonate, zinc carbonate or a mixture of two or more thereof.

DETAILED DESCRIPTION OF THE INVENTION

A polyolefin resin having a melt index (JIS K-6760) of 0.01 to 0.5 which can be used in a cleaning composition of the present invention is preferably one or a mixture of two or more selected from the group consisting of a high-density polyethylene, a low-density polyethylene and polypropylene. The amount of the polyolefin resin to be used is from 50 to 95% by weight with respect to the composition. When the amount of the polyolefin resin is less than 50% by weight, the viscosity of the cleaning composition is too low to exert a cleaning effect. Furthermore, when it is more than 95% by weight, the amounts of the other components decrease, with the undesirable result that the cleaning effect of the cleaning composition deteriorates.

Examples of an ethylene-acrylic copolymer which can be used in the present invention include an ethylenemethyl methacrylate copolymer, an ethylene-ethyl acrylate copolymer and an ethylene-methyl acrylate copolymer. They can be synthesized from ethylene and methyl methacrylate, ethylene and ethyl acrylate, or ethylene and methyl acrylate in accordance with a high-pressure radical polymerization. As the ethylene-methyl methacrylate copolymer, the trade name "Acryft" made by Sumitomo Chemical Co., Ltd. is available, and as the ethylene-ethyl acrylate copolymer, the trade name "NUC Copolymer" made by Nippon Unicar Co., Ltd. is available. The amount of the ethylene-acrylic copolymer to be used is from 0.1 to 15% by weight with respect to the composition. When the amount of the ethylene-acrylic copolymer is less than 0.1% by weight, it is difficult to remove the preceding resin which is an adhered soil in a molding machine, and when the amount is more than 15% by weight, projections are undesirably formed on the surface of molded articles.

A neutral salt of sulfonic acid which can be used in the cleaning composition of the present invention is a sodium salt, a calcium salt or a magnesium salt of an alkylbenzenesulfonic acid having 10 to 18 carbon atoms, or a sodium salt of an alkylmethyltauric acid having 10 to 18 carbon atoms. They can be used singly or in the form of a mixture.

The amount of the neutral salt of the sulfonic acid is from 2 to 30% by weight with respect to the composition.

When the amount of the neutral salt of the sulfonic acid is less than 2% by weight, cleaning power is low, and when it is more than 30% by weight, the flowability at a melting time of the obtained cleaning composition is too high, so that it is difficult to remove the preceding adhered resin in the molding machine and cleaning ability undesirably deteriorates.

Furthermore, basic magnesium carbonate, magnesium hydroxide, aluminum hydroxide, zinc carbonate or a mixture of two or more thereof which can be used in the composition of the present invention is used in an amount of 0.1 to 10% by weight with respect to the composition. When the amount of this material is less than 0.1% by weight, the cleaning effect of the obtained cleaning composition obtained is poor, and when it is more than 10% by weight, molded articles unpreferably become cloudy under the influence of the cleaning composition, when a resin is molded after the cleaning of the molding machine with the cleaning composition.

Some additives may be added to the cleaning composition of the present invention, and examples of the additives include metallic soaps such as basic magnesium stearate, magnesium stearate, calcium stearate or zinc stearate; a heat stabilizer such as bisphenol A or dibutyltin maleate; and surface active agents such as an alkyl ether sodium sulfate, α-olefin sodium sulfonate and ethanolamine alkylbenzenesulfonate.

Furthermore, the cleaning composition of the present invention, if necessary, may contain a water-repellent compound, such as a wax, as, for example, polyethylene wax or polypropylene wax, silicone, wax or a metallic salt of a higher fatty acid (e.g., calcium stearate or magnesium stearate).

When the cleaning composition of the present invention is used, the color changeover and material changeover of super-engineering plastics whose molding temperature is a very high temperature of about 400° C. can be achieved with the extremely noticeable cleaning effect at the same molding temperature by the use of a small amount of the cleaning composition.

For example, when the color changeover of a polyether imide resin is carried out by the use of the cleaning composition of the present invention, the time necessary for the cleaning and removal can be shortened to about ⅛ of a time taken when a polycarbonate resin (containing a glass fiber) is used.

EXAMPLES

Now, a cleaning composition of the present invention will be described with reference to examples, but the present invention should not be limited thereto.

EXAMPLE 1

In a 20-liter Henschel mixer (trade name) were placed 7.5 kg of a high-density polyethylene having a melt flow index (JIS K6760) of 0.06, 1.0 kg of an ethylene-ethyl acrylate copolymer (NUC copolymer DPDJ-182 made by Nippon Unicar Co., Ltd.), 0.70 kg of sodium dodecylbenzenesulfonate, 0.70 kg of basic magnesium carbonate, 0.05 kg of magnesium stearate and 0.05 kg of polyethylene wax (number average molecular weight=1500), and they were then stirred and mixed at a rotational speed of 500 rpm for 3 minutes.

The mixture was then melted, kneaded and then extruded at a cylinder temperature of 200° C. and at a die temperature of 210° C., and it was cooled in a water tank. Afterward, the cooled mixture was cut by a pelletizer to obtain a cleaning composition.

For this cleaning composition, the following cleaning test was carried out.

The interior of an injection molding machine having a cylinder temperature of 400° C., a die temperature of 410° C. and a clamping force of 100 weight tons was contaminated with a polyetherimide resin (abbreviated to "PEI") (black) which was a previously used resin, and 600 g of the above-mentioned cleaning resin were used to remove the preceding resin and to clean the injection molding machine. A time required for the removal/cleaning was 10 minutes.

EXAMPLE 2

A cleaning composition was obtained from 7.70 kg of polypropylene having a melt flow index (JIS K6758) of 0.3, 0.80 kg of an ethylene-methyl methacrylate copolymer (trade name WD-301 made by Sumitomo Chemical Co., Ltd.), 0.70 kg of sodium dodecylbenzenesulfonate, 0.60 kg of magnesium hydroxide, 0.10 kg of basic magnesium stearate and 0.10 kg of polyethylene wax in accordance with the same procedure as in Example 1. For this cleaning composition, the following cleaning test was carried out.

The interior of an injection molding machine having a cylinder temperature of 400° C., a die temperature of 410° C. and a clamping force of 150 weight tons was contaminated with a liquid crystal polymer (abbreviated to "LCP") (black) (trade name Nisseki Zaider RCZ10 G430) which was a previously used resin, and 1000 g of the above-mentioned cleaning composition were used to remove the preceding resin and to clean the injection molding machine. A time required for the removal/cleaning was 12 minutes.

EXAMPLE 3

A cleaning composition was obtained from 7.50 kg of high-density polyethylene having a melt flow index (JIS K6760) of 0.03, 1.00 kg of an ethylene-methyl methacrylate copolymer (trade name Aclift WD-201 made by Sumitomo Chemical Co., Ltd.), 0.80 kg of sodium dodecylbenzenesulfonate, 0.50 kg of basic magnesium carbonate, 0.10 kg of magnesium stearate and 0.10 kg of polyethylene wax in accordance with the same procedure as in Example 1. For this cleaning composition, the following cleaning test was carried out.

The interior of an injection molding machine having a cylinder temperature of 410° C., a die temperature of 420° C. and a clamping force of 50 weight tons was contaminated with a polyether ether ketone resin (abbreviated to "PEEK") (black) which was a previously used resin, and 400 g of the above-mentioned cleaning resin were used to remove the preceding resin and to clean the injection molding machine. A time required for the removal/cleaning was 10 minutes.

EXAMPLE 4

A cleaning composition was obtained from 7.50 kg of polypropylene having a melt flow index (JIS K6758) of 0.05, 0.80 kg of an ethylene-ethyl methacrylate copolymer (trade name NUC Copolymer, NUC-6220 made by Nippon Unicar Co., Ltd.), 0.60 kg of sodium dodecylbenzenesulfonate, 1.00 kg of basic magnesium carbonate, 0.05 kg of basic magnesium stearate and 0.05 kg of polyethylene wax in accordance with the same procedure as in Example 1. For this cleaning composition, the following cleaning test was carried out.

The interior of an injection molding machine having a cylinder temperature of 350° C., a die temperature of 360° C. and a clamping force of 100 weight tons was contaminated with a polyether sulfone resin (abbreviated to "PES") (black) which was a previously used resin, and 500 g of the above-mentioned cleaning resin were used to remove the preceding resin and to clean the injection molding machine. A time required for the removal/cleaning was 9 minutes.

EXAMPLE 5

A cleaning composition was obtained from 8.50 kg of low-density polyethylene having a melt flow index (JIS K6760) of 0.1, 0.50 kg of an ethylene-methyl methacrylate copolymer (trade name Aclift WD-302 made by Sumitomo Chemical Co., Ltd.), 0.30 kg of magnesium dodecylbenzenesulfonate, 0.50 kg of magnesium hydroxide, 0.10 kg of magnesium stearate and 0.10 kg of polyethylene wax in accordance with the same procedure as in Example 1. For this cleaning composition, the following cleaning test was carried out.

The interior of an injection molding machine having a cylinder temperature of 330° C., a die temperature of 350° C. and a clamping force of 50 weight tons was contaminated with a polyether sulfone resin (abbreviated to "PPS") (black) which was a previously used resin, and 510 g of the above-mentioned cleaning resin were used to remove the preceding resin and to clean the injection molding machine. A time required for the removal/cleaning was 8 minutes.

EXAMPLE 6

A cleaning composition was obtained from 7.50 kg of low-density polyethylene having a melt flow index (JIS K6760) of 0.3, 1.00 kg of an ethylene-methyl methacrylate copolymer (trade name Aclift WD-303 made by Sumitomo Chemical Co., Ltd.), 0.80 kg of magnesium dodecylbenzenesulfonate, 0.50 kg of basic magnesium carbonate, 0.10 kg of basic magnesium stearate and 0.10 kg of polyethylene wax in accordance with the same procedure as in Example 1. For this cleaning composition, the following cleaning test was carried out.

The interior of an injection molding machine having a cylinder temperature of 350° C., a die temperature of 370° C. and a clamping force of 100 weight tons was contaminated with a polysulfone resin (abbreviated to "PSF") (black) which was a previously used resin, and 450 g of the above-mentioned cleaning resin were used to remove the preceding resin and to clean the injection molding machine. A time required for the removal/cleaning was 9 minutes.

COMPARATIVE EXAMPLE 1

A cleaning composition was obtained from 8.5 kg of high-density polyethylene having a melt flow index (JIS K6760) of 0.06, 0.87 kg of sodium dodecylbenzenesulfonate, 0.50 kg of basic magnesium carbonate, 0.10 kg of magnesium stearate and 0.10 kg of polyethylene wax in accordance with the same procedure as in Example 1. For this cleaning composition, the following cleaning test was carried out.

The interior of an injection molding machine having a cylinder temperature of 410° C., a die temperature of 420° C. and a clamping force of 50 weight tons was contaminated with a polyether ether ketone resin (abbreviated to "PEEK") (black) which was a previously used resin, and 400 g of the above-mentioned cleaning composition were used.

The cleaning composition could not maintain melting viscoelasticity owing to the high temperature of the above-mentioned conditions, so that viscosity deteriorated and it was impossible to clean the interior of the molding machine.

COMPARATIVE EXAMPLE 2

The interior of an injection molding machine having a cylinder temperature of 410° C., a die temperature of 420° C. and a clamping force of 50 weight tons was contaminated with a polyether ether ketone (abbreviated to "PEEK") (black) which was a previously used resin. Afterward, the temperature was lowered to about 300° C., and the cleaning of the molding machine and the removal of the preceding resin were carried out by the use of a sufficiently dried polycarbonate resin containing a glass fiber, while the temperature was further lowered. The amount of the polycarbonate resin required to remove the receding resin at the above-mentioned lowered temperature was 10 kg. In addition, a time required for these operations was 80 minutes.

COMPARATIVE EXAMPLE 3

For a commercially available cleaner (trade name Rotilite made by Swiss-Romatine Co. Ltd.) containing an acrylic resin as the main component, a cleaning test was carried out in accordance with the same procedure as in Comparative Example 1. As a result, the cleaner could not maintain melting viscoelasticity owing to the high temperature of the above-mentioned conditions, so that viscosity deteriorated and it was impossible to clean the interior of the molding machine.

COMPARATIVE EXAMPLE 4

A cleaning composition was obtained from 7.50 kg of high-density polyethylene having a melt flow index (JIS K6760) of 0.03, 1.00 kg of polymethyl methacrylate, 0.80 kg of sodium dodecylbenzenesulfonate, 0.50 kg of basic magnesium carbonate, 0.10 kg of magnesium stearate and 0.10 kg of polyethylene wax in accordance with the same procedure as in Example 1.

For this cleaning composition, the following cleaning test was carried out.

The interior of an injection molding machine having 410° C. and a clamping force of 50 weight tone was contaminated with a polyetherimide resin (abbreviated to "PEI") (black) which was the preceding resin, and 500 g of the above-mentioned cleaning resin were used. As a result, the cleaning composition could not maintain melting viscoelasticity owing to the high temperature, so that viscosity deteriorated and it was impossible to clean the interior of the molding machine.

The cleaning composition used in Examples 1 to 6 and Comparative Examples 1 to 4 as well as the results of the use thereof are set forth in Table 1.

TABLE 1

|  | Example |  |  |  |
|---|---|---|---|---|
|  | 1 | 2 | 3 | 4 |
| Components of Cleaning Composition (Kg) | | | | |
| High-density Polyethylene | 7.5 |  | 7.5 |  |
| Low-density Polyethylene | | | | |
| Polypropylene |  | 7.7 |  | 7.6 |
| Ethylene-methyl Methacrylate |  | 0.8 | 1.0 |  |
| Ethylene-ethyl Acrylate | 1.0 | | | |
| Neutral Salt of Alkylbenzene-sulfonic Acid | 0.7 | 0.7 | 0.8 | 0.6 |
| Basic Magnesium Carbonate | 0.7 |  | 0.5 | 1.0 |
| Magnesium Hydroxide |  | 0.6 |  |  |
| Magnesium Stearate | 0.05 |  | 0.1 |  |
| Basic Magnesium Stearate |  | 0.1 |  |  |
| PE-WAX | 0.05 | 0.1 | 0.1 |  |
| Conditions | | | | |
| Temperature (°C.) | 410 | 410 | 420 | 360 |
| Amount of Cleaning Composition (g) | 600 | 1000 | 400 | 500 |
| Clamping Force of Injection Molding Machine (weight tons) | 100 | 150 | 50 | 100 |
| Preceding Resin (color) | PEI Black | LCP Black | PEEK Black | PES Black |
| Time Required for Cleaning/removal (min.) | 10 | 12 | 10 | 9 |

|  | Example | | Comp. Ex. | |
|---|---|---|---|---|
|  | 5 | 6 | 1 | 2* |
| Components of Cleaning Composition (Kg) | | | | |
| High-density Polyethylene |  |  | 8.5 |  |
| Low-density Polyethylene | 8.5 | 7.5 |  |  |
| Polypropylene | | | | |
| Ethylene-methyl Methacrylate | 0.5 | 1.0 |  |  |
| Ethylene-ethyl Acrylate | | | | |
| Neutral Salt of Alkylbenzene-sulfonic Acid | 0.3 | 0.8 | 0.8 |  |
| Basic Magnesium Carbonate |  | 0.5 | 0.5 |  |
| Magnesium Hydroxide | 0.5 | | | |
| Magnesium Stearate | 0.1 |  | 0.1 |  |
| Basic Magnesium Stearate |  | 0.1 |  |  |
| PE-WAX | 0.1 | 0.1 | 0.1 |  |
| Conditions | | | | |
| Temperature (°C.) | 350 | 370 | 420 | 300 |
| Amount of Cleaning Composition (g) | 510 | 450 | 400 | 10000 |
| Clamping Force of Injection Molding Machine (weight tons) | 50 | 100 | 50 | 50 |
| Preceding Resin (color) | PPS Black | PSF Black | PEEK Black | PEEK Black |
| Time Required for Cleaning/removal (min.) | 8 | 9 | ∞ | 80 |

|  | Comparative Example | |
|---|---|---|
|  | 3 | 4 |
| Components of Cleaning Composition (Kg) | | |
| High-density Polyethylene |  | 7.5 |
| Polymethyl Methacrylate |  | 1.0 |
| Neutral Salt of Alkylbenzene-sulfonic acid |  | 0.8 |
| Basic Magnesium Carbonate |  | 0.5 |
| Magnesium Stearate |  | 0.1 |
| Polyethylene Wax |  | 0.1 |
| Rotilite Cleaner | 100 |  |
| Conditions | | |
| Temperature (°C.) | 420 | 410 |
| Amount of Cleaning Composition (g) | 400 | 500 |
| Clamping Force of Injection Molding Machine (weight tons) | 50 | 50 |
| Preceding Resin (color) | PEEK Black | PEI Black |
| Time Required for Cleaning/removal (min.) | ∞ | ∞ |

*In Comparative Example 2, a polycarbonate resin (containing a glass fiber) was used, and a molding temperature of PEEK (black) was lowered from 410° C. to 300° C.

What is claimed is:

1. A cleaning composition for a resin molding machine comprising 50 to 95% by weight of a polyolefin resin having a melt index of 0.01 to 0.5, 0.1 to 15% by weight of an ethylene-acrylic copolymer, 2 to 30% by weight of a neutral salt of an organic sulfonic acid and 0.1 to 10% by weight of at least one material selected from the group consisting of basic magnesium carbonate, magnesium hydroxide, potassium carbonate and zinc carbonate.

2. The cleaning composition according to claim 1 wherein said polyolefin resin is at least one material selected from the group consisting of a high-density polyethylene, a low-density polyethylene and polypropylene.

3. The cleaning composition according to claim 1 wherein said neutral salt of sulfonic acid is at least one salt selected from the group consisting of sodium salt, a calcium salt or a magnesium salt of an alkyl-benzenesulfonic acid having an alkyl group of 10 to 18 carbon atoms.

4. The cleaning composition of claim 1 wherein said at least one material comprises basic magnesium carbonate.

* * * * *